United States Patent
Onaka

(10) Patent No.: US 8,471,401 B2
(45) Date of Patent: Jun. 25, 2013

(54) SWITCH DEVICE FOR VEHICLE

(75) Inventor: Junichiro Onaka, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 12/875,575

(22) Filed: Sep. 3, 2010

(65) Prior Publication Data

US 2011/0062010 A1    Mar. 17, 2011

(30) Foreign Application Priority Data

Sep. 11, 2009 (JP) ................... 2009-210439

(51) Int. Cl.
*B60L 1/00* (2006.01)

(52) U.S. Cl.
USPC .......................................... 307/9.1

(58) Field of Classification Search
USPC ................. 307/9.1, 10.1; 701/36, 41
See application file for complete search history.

(56) References Cited

U.S. PATENT DOCUMENTS

| | | | |
|---|---|---|---|
| 5,949,149 A * | 9/1999 | Shitanaka et al. | 307/10.1 |
| 6,769,320 B1 * | 8/2004 | Bollgohn et al. | 73/866.3 |
| 7,177,741 B2 * | 2/2007 | Nagasaka | 701/36 |
| 7,703,570 B2 * | 4/2010 | Ringger et al. | 180/336 |
| 8,155,837 B2 * | 4/2012 | Aoki et al. | 701/41 |
| 2003/0023353 A1 * | 1/2003 | Badarneh | 701/1 |

FOREIGN PATENT DOCUMENTS

| | | |
|---|---|---|
| JP | 05-097029 UM | 12/1993 |
| JP | 10-097821 | 4/1998 |
| JP | 2007-257037 A | 10/2007 |
| JP | 2010-073546 A | 4/2010 |

OTHER PUBLICATIONS

Denso corp et al., Switch Signal Processor, Apr. 2, 2010, (English Machine Translation dated Sep. 4, 2012).*
Machine translation of JP 10-097821, Matsushita Electric Ind. Co. Ltd., published Apr. 14, 1998.*

* cited by examiner

*Primary Examiner* — Jared Fureman
*Assistant Examiner* — Duc M Pham
(74) *Attorney, Agent, or Firm* — Rankin, Hill & Clark LLP

(57) ABSTRACT

A switch device for a vehicle including: a first switch that enables input by a rotation operation or a tilting operation; a second switch that enables input by a predetermined operation; an operation direction detector that detects the operation direction of the rotation direction of the first switch or the tilting operation of the first switch; and a controller that is capable of controlling an on-vehicle equipment in accordance with the input operations to the first switch and the second switch, wherein the controller, in the case of the second switch being located substantially on an extension of the operation direction of the first switch, prohibits execution of a control of the on-vehicle equipment in accordance with an input operation to the second switch until a predetermined time from after the operation direction of the first switch is detected by the operation direction detector elapses.

6 Claims, 5 Drawing Sheets

SWITCH DEVICE FOR VEHICLE

Priority is claimed on Japanese Patent Application No. 2009-210439, filed Sep. 11, 2009, the content of which is incorporated herein by reference.

BACKGROUND OF THE INVENTION

1. Field of the Invention

The present invention relates to a switch device for a vehicle.

2. Description of Related Art

There is known an operation device for on-vehicle equipment that provides a rotary switch and a seesaw-type rocker switch that are disposed adjacent to each other, for example, on the steering wheel of a vehicle or in the vicinity of the steering wheel (for example, refer to Japanese Unexamined Patent Application, First Publication No. H10-97821).

SUMMARY OF THE INVENTION

In the aforementioned on-vehicle equipment operation device according to the related art, the seesaw-type rocker switch is disposed substantially on an extension in the rotation operation direction of the rotary switch by the operator. For this reason, there is the risk of the operator erroneously operating the rocker switch when operating the rotary switch.

In relation to this kind of problem, greatly spacing apart a plurality of switches in order to prevent erroneous operation of switches by the operator is difficult in the restricted disposal space in a vehicle. In the meantime, in the case of providing a barrier (such as a rib or the like) between adjacent switches for preventing erroneous operation, the problem arises of the design being adversely affected.

The present invention was achieved in view of the above circumstances, and has an object of providing a switch device for a vehicle that is capable of preventing erroneous operation of on-vehicle equipment switches by the operator while preventing an increase in costs required for disposing a plurality of switches that are to be operated by an operator.

In order to solve the aforementioned issues and achieve the object, the switch device for a vehicle according to the first aspect of the present invention includes: a first switch that is provided at a predetermined location of a vehicle and that enables input by a rotation operation or a tilting operation; a second switch that is provided in the vicinity of the first switch and that enables input by a predetermined operation; an operation direction detector that detects the operation direction of the rotation direction of the first switch or the tilting operation of the first switch; and a controller that is capable of controlling an on-vehicle equipment in accordance with the input operations to the first switch and the second switch, wherein the controller, in the case of the second switch being located substantially on an extension of the operation direction of the first switch that is detected by the operation direction detector, prohibits execution of a control of the on-vehicle equipment in accordance with an input operation to the second switch until a predetermined time from after the operation direction of the first switch is detected by the operation direction detector elapses.

Based on the switch device for a vehicle according to the first aspect of the present invention, the second switch that is located substantially on an extension in the rotation direction or tilting direction of the first switch is disabled until a predetermined time from after the rotation direction or tilting direction of the first switch detected elapses. Thereby, even in the case of the second switch being erroneously operated without the intent of the driver in succession with a deliberate rotation operation or tilting operation by the operator on the first switch, it is possible to prevent the on-vehicle equipment from operating unnecessarily. As a result, it is possible to prevent erroneous operation of the on-vehicle equipment by a plurality of switches, and it is possible to suitably enhance the placement latitude of a plurality of switches in the vehicle.

Moreover, in a switch device for a vehicle according to a second aspect of the present invention the controller, in the case of the function according to an input operation to the second switch and the function according to an input operation to the first switch being mutually unrelated, sets a first time to the predetermined time, and in the case of the function according to an input operation to the second switch and the function according to an input operation to the first switch being mutually related, sets a second time that is shorter than the first time to the predetermined time.

Based on the switch device for a vehicle according to the second aspect of the present invention, in the case of the operator deliberately performing an input operation of the first switch and an input operation of the second switch in succession over a short time interval, due to the function relating to the input operation on the second switch and the function relating to the input operation on the first switch having a mutual relation, it is possible to prevent the execution of a control corresponding to the input operation on the second switch from being prohibited against the will of the driver.

DETAILED DESCRIPTION OF THE INVENTION

Hereinbelow, the switch device for a vehicle according to an embodiment of the present invention shall be described with reference to the appended drawings.

Figure 1:
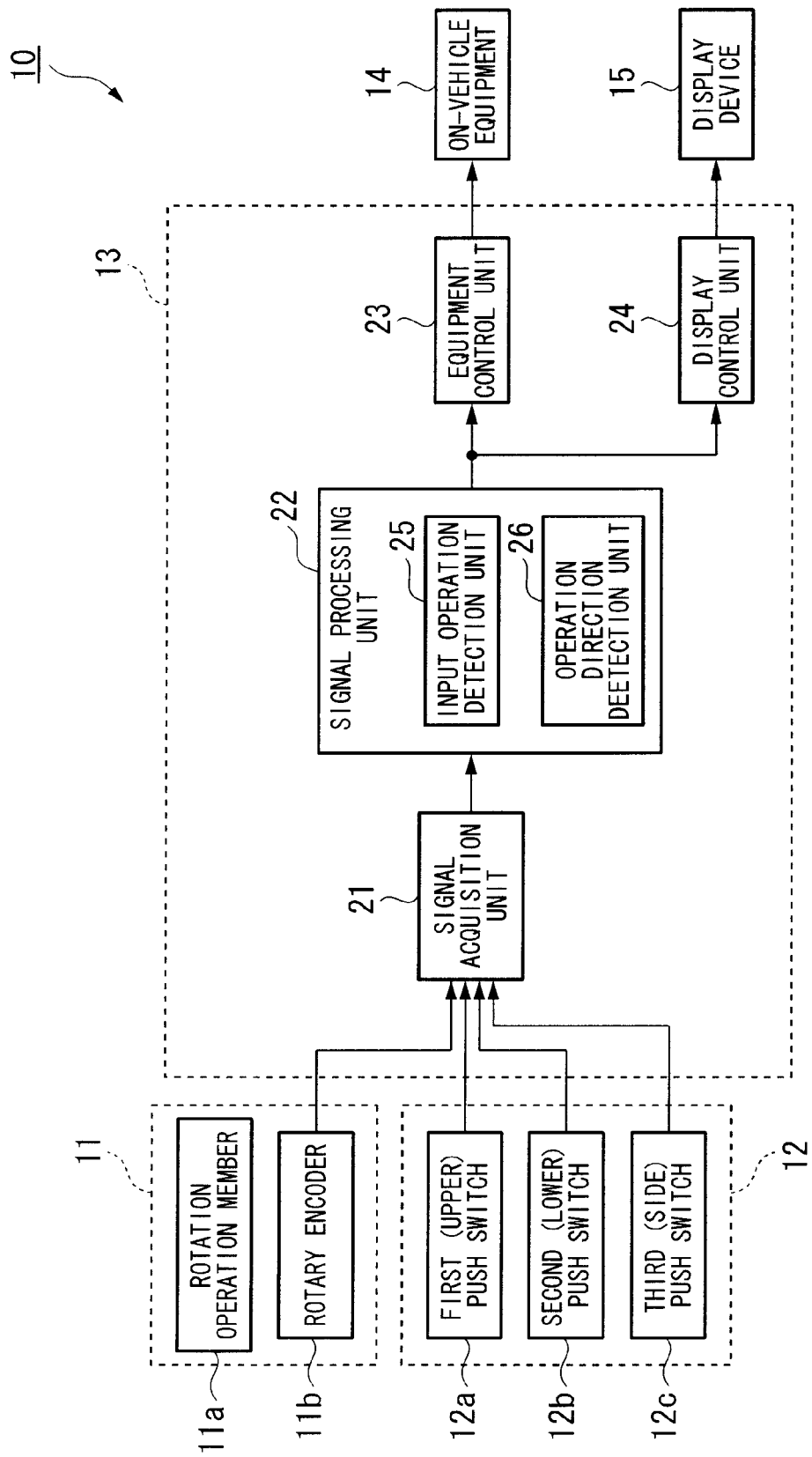
FIG. 1 is a configuration drawing of the switch device for a vehicle according to an embodiment of the present invention.

As shown for example in FIG. 1, a switch device 10 for a vehicle according to the present embodiment is provided with a first switch 11 that allows input by a rotation operation by an operator, a second switch 12 that is provided near the first switch and allows input of a predetermined operation (for example, a pressing operation, a rotation operation, or the like) by the operator, a processing device 13, an on-vehicle equipment 14, and a display device 15.

The first switch 11 is, for example, a rotary switch, and is provided with a rotation operation member 11a and a rotary encoder 11b.

The second switch 12 is for example provided with first to third push switches 12a, 12b, and 12c.

Figure 2:
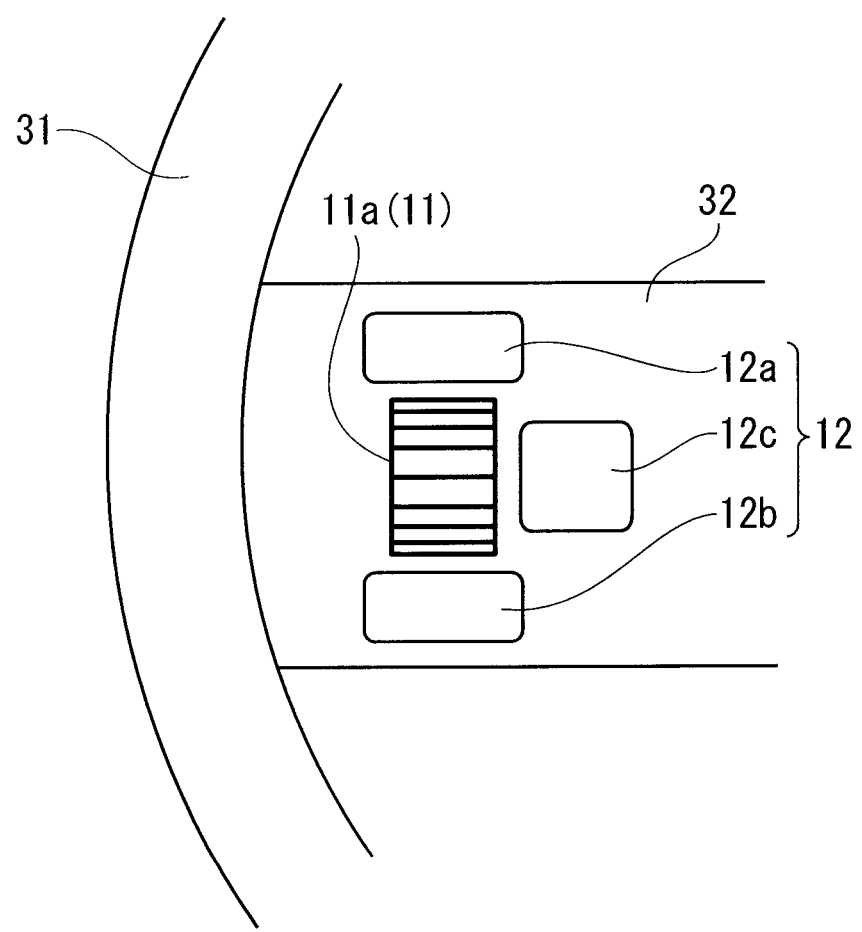
FIG. 2 is a drawing that shows a placement example of the switch device for a vehicle according to the embodiment.
Figure 3A:
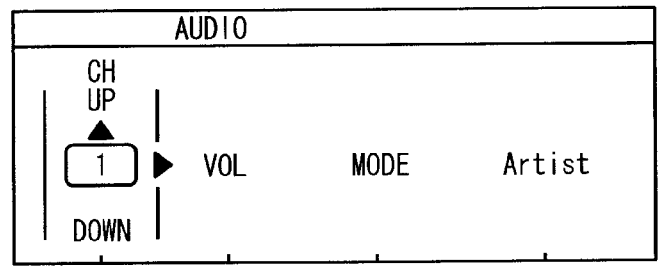
FIGS. 3A to 3D are drawings that show display examples of the display device of the switch device for a vehicle according to the embodiment.
Figure 3B:
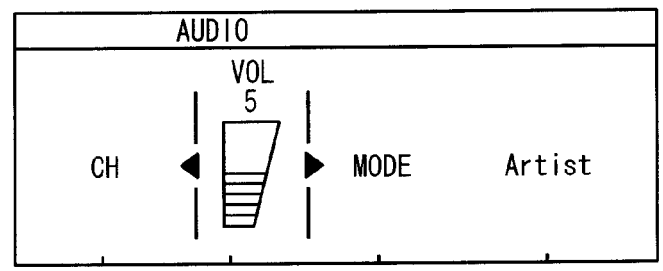
Figure 3C:
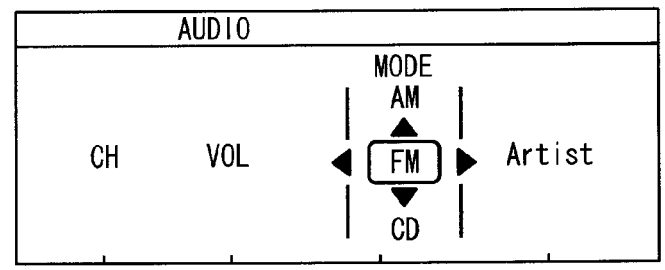
Figure 3D:
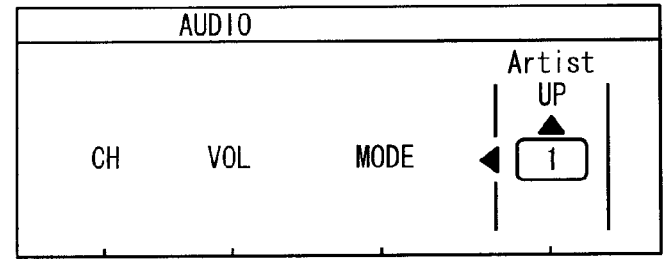

The first switch 11 and the second switch 12 are disposed on a spoke portion 32 of a steering wheel 31 in the vehicle interior, within a positional range to be operable by a finger (for example, the thumb or the like) of the driver who is grasping the steering wheel 31 as shown in FIG. 2.

The rotation operation member 11a of the first switch 11 is rotatable about a rotational axis that for example extends in the horizontal direction that is parallel to the surface of the spoke portion 32. A portion of the outer periphery of the rotation operation member 11a projects from the surface of the spoke portion 32 to the outside, and is operated by the operator so as to rotate from the lower side to the upper side, or from the upper side to the lower side.

The rotary encoder 11b outputs a signal that corresponds to the rotational displacement, the rotational angle, and the rotational direction of the rotation operation member 11a.

The first to third push switches 12a, 12b, 12c of the second switch 12 are arranged at positions in the vicinity of the rotational operation member 11a. For example, the first push switch 12a is disposed above the rotational operation member 11a, the second push switch 12b is disposed below the rotational operation member 11a, and the third push switch 12c is disposed to the side of the rotational operation member 11a. That is, the first push switch 12a and the second push switch 12b are disposed on the surface of the spoke portion 32, on an approximate extension in the rotation direction of a portion of the periphery of the rotational operation member 11a that projects from that surface to the outside. The first push switch 12a, in the case of the portion of the periphery of the rotational operation member 11a being operated so as to rotate from the lower side to the upper side, is disposed to be an extension in the rotation direction thereof (that is, above the rotational operation member 11a). The second push switch 12b, in the case of the portion of the periphery of the rotational operation member 11a being operated so as to rotate from the upper side to the lower side, is disposed to be an extension in the rotation direction thereof (that is, below the rotational operation member 11a).

The first to third push switches 12a, 12b, 12c of the second switch 12 output a signal in accordance with a pressing operation by the operator.

The processing device 13 is for example provided with a signal acquisition unit 21, a signal processing unit (controller) 22, an equipment control unit 23, and a display control unit 24.

The signal acquisition unit 21 acquires the signals that are output from the rotary encoder 11b of the first switch 11 and the push switches 12a, 12b, 12c of the second switch 12.

The signal processing unit 22 outputs a command signal that instructs operation of the equipment control unit 23 and the display control unit 24 based on the signals that are acquired by the signal acquisition unit 21.

The signal processing unit 22 is for example provided with an input operation detection unit 25 and an operation direction detection unit (operation direction detector) 26.

The input operation detection unit 25 acquires information such as the output timing of signals that are output from the switches 11 and 12 and the operation continuation time of an input operation by the operator to the switches 11 and 12.

The operation direction detection unit 26 detects the rotation direction of the rotation operation member 11a based on the signal that has been output from the rotary encoder 11b of the first switch 11.

Then, signal processing unit 22 disables the second switch 12 that is located substantially on an extension in the rotation direction that is detected by the operation direction detection unit 26 (that is, the first push switch 12a or the second push switch 12b) until a predetermined time (disablement time) from after the rotation direction of the rotation operation member 11a of the first switch 11 is detected by the operation direction detection unit 26 elapses, and prohibits execution of control of the on-vehicle equipment 14 and the display device 15 in accordance with an input operation to the second switch 12.

Note that the predetermined time is made to be a first time Ta in the case of the function according to an input operation to the second switch 12 and the function according to an input operation to the first switch 11 being mutually unrelated.

On the other hand, the predetermined time is made to be a second time Tb that is shorter than the first time Ta in the case of the function according to an input operation to the second switch 12 and the function according to an input operation to the first switch 11 being mutually related.

Also, the predetermined time is made to be a third time Tc that is longer than the second time Tb in the case of the function according to an input operation to the second switch 12 and the function according to an input operation to the first switch 11 being mutually related, and those functions being functions to adjust the running parameters of the vehicle.

The equipment control unit 23 controls the on-vehicle equipment 14 based on a command signal that is output from the signal processing unit 22.

Note that the on-vehicle equipment 14 is constituted from, for example, an air conditioning unit, an audio device, an illumination device, a wiper, a defogging device, a navigation device, a drive assist device, and a safe driving device.

For example, the equipment control unit 23 controls switching of the selection of the on-vehicle equipment 14 that is made the object of control in accordance with a rotation operation to the rotation operation member 11a of the first switch 11, switching of the selection of the control item in each on-vehicle equipment 14, the temperature setting in the air conditioning unit, the volume setting in the audio device, the optical axis setting in a headlight that is the illumination device, and the discontinuous time setting in the wiper, and the like.

Also, in accordance with for example the pressing operation to the second switch 12, confirmation of the selection of the on-vehicle equipment 14 that is made the object of control, confirmation of the selection of the control item in each on-vehicle equipment 14, switching of the blow outlet in the air conditioning unit, and confirmation of the song selection in the audio device is controlled.

The display control unit 24 controls the display device 15 based on a command signal that is output from the signal processing unit 22.

Note that the display device 15 is for example constituted from a monitor that is arranged in the instrument panel, or a head-up display by projected light onto the front window.

For example, in the case of the operation of an audio device that is the on-vehicle equipment 14 being controlled based on the command signal that is output from the signal processing unit 22, as shown in FIGS. 3A to 3D, a plurality of selection items relating to operation of the audio device are displayed on the display screen of the display device 15. These selection items consist of the symbol "CH" that indicates the setting of the broadcast reception channel, the symbol "VOL" that indicates the setting of the volume, the symbol "MODE" that indicates the setting of the audio source, and the symbol "Artist" that indicates the setting of the song. These selection items that can be selected are switched in a sequential manner in accordance with the rotation operation on the rotation operation member 11a of the first switch 11. The switching direction changes in accordance with the rotation direction of the rotation operation member 11a.

In the state of a selection item being selectable, a suitable selection item changes from the selectable state to the state of selection confirmation in accordance with an input operation to the second switch 12 (for example, the second push switch 12b).

Then, a symbol that indicates the characteristic value that is set for the selection item that is confirmed, for example, the channel number for the broadcast reception channel, the volume value for the volume, the audio source name for the audio source, the selection number for the song selection, and the like, is displayed on the display screen of the display device 15. The characteristic values that are set for these selection items change in accordance with the rotation operation to the rotation operation member 11a of the first switch 11, or in accordance with the pressing operation to the second switch 12, or in accordance with a combination of the rotation operation member 11a to the first switch 11 and the pressing operation to the second switch 12.

For example, the channel number that has been set to the broadcast reception channel, or the volume value that has been set for the volume sequentially changes in accordance with the rotation operation to the rotation operation member 11a of the first switch 11. Also, for example, the selection number that has been set for the song selection is sequentially changed in accordance with the rotation operation to the rotation operation member 11a of the first switch 11. The selection umber is then confirmed in accordance with a pressing operation to the second switch 12 (for example, the second push switch 12b).

The audio device of the on-vehicle equipment 14 is controlled so as to satisfy the characteristic values that have been set for the selection items.

Also, for example, in the case of the operation of the air conditioning unit that is the on-vehicle equipment 14 being controlled based on a command signal that is output from the signal processing unit 22, the plurality of setting items relating to the operation of the air conditioning unit are displayed on the display screen of the display device 15. These setting items consist of for example the symbol "inside/outside air" that indicates the setting of the air circulation configuration, the symbol "TEMP" that indicates the temperature setting, the symbol "FAN" that indicates the setting of the movement state of the blower fan, and the symbol "MODE" that indicates the setting of the blow outlet. The characteristic value that is set for each setting item is changed in accordance with the input operation to the switches 11 and 12 that are matched to each setting item.

For example, internal air circulation and external air circulation that are set for the air circulation configuration are changed in turn in accordance with an input operation to the second switch 12 (for example, the first push switch 12a). Also, for example the temperature value that is set for the temperature is sequentially changed in accordance with the rotation operation to the rotation operation member 11a of the first switch 11. Also, for example the ON and OFF states that are set for the operation state of the blower fan are sequentially changed in accordance with an input operation to the second switch 12 (for example, the third push switch 12c). Also, for example the plurality of selection modes that are set with respect to a blow outlet are sequentially changed in accordance with an input operation to the second switch 12 (for example, the second push switch 12b).

The air conditioning unit of the on-vehicle equipment 14 is controlled so as to satisfy the characteristic values that have been set for the selection items.

Note that in the case of the rotation direction of the rotation operation member 11a of the first switch 11 being detected by the operation direction detection unit 26, that is, in the case of the rotation operation being performed by the operator to the rotation operation member 11a of the first switch 11, the second switch 12 that is located substantially on an extension in the rotation direction (for example, the first push switch 12a or the second push switch 12b) is disabled until a predetermined time (disablement time) elapses. In this case, functions relating to the input operation to the second switch 12, for example, confirmation of the selection of the on-vehicle equipment 14 that is made the object of control, confirmation of the selection of the control item in each on-vehicle equipment 14, and confirmation of the selection of the characteristic value that is set for each control item is prohibited. Moreover, for the display on the display screen of the display device 15 relating to the second switch 12 that has been disabled, the brightness or contrast is reduced or stopped.

The disablement time is changed in accordance with the function relating to the input operation on the second switch 12 and the function relating to the input operation on the first switch 11.

For example, as shown in Table 1 below, the temperature setting in the air conditioning unit that is a function relating to the rotation operation on the rotation operation member 11a of the first switch 11, and the switching of the blow outlet in the air conditioning unit that is a function relating to the pressing operation on the second switch 12 (for example, the second push switch 12b) are mutually unrelated. Therefore, the first time Ta (for example, 300 milliseconds or the like) is set as the disablement time.

Also, for example the switching of the selection number of a song selection in the audio device that is a function relating to the rotation operation to the rotation operation member 11a of the first switch 11, and the confirmation of the selection number of the song selection in the audio device that is a function relating to the pressing operation to the second switch 12 (for example, the second push switch 12b) are mutually related. As described above, if the operations to the first switch 11 and the second switch 12 should be performed continuously, functions relating to the operations are mutually related. Therefore, the second time Tb (for example, 100 milliseconds or the like) that is shorter than the first time Ta (for example, 300 milliseconds or the like) is set as the disablement time.

Also, for example the switching of the magnitude of the running parameters of the vehicle that is a function relating to the rotation operation on the rotation operation member 11a of the first switch 11, and the confirmation of the magnitude of the running parameters of the vehicle that is a function relating to the pressing operation on the second switch 12 (for example, the second push switch 12b) are mutually related. Moreover, in consideration of preventing an erroneous operation in the case of adjusting the running parameters of the vehicle, the third time Tc (for example, 300 milliseconds or the like) that is longer than the second time Tb (for example, 100 milliseconds or the like) is set as the disablement time.

TABLE 1

| Rotary Switch | Running Parameters (State Quantity Value Selection) | Audio Device (Song Selection) | Air-Conditioning Unit (Temperature Setting)) |
|---|---|---|---|
| Second Push Switch Disablement Time | Confirmation Tc | Confirmation Tb (<Tc) | Setting of Blow Outlet Ta (>Tb) |

The switch device 10 for a vehicle according to the present embodiment has the aforementioned constitution. Next, the operation of the switch device 10 for a vehicle shall be described.

Figure 4:
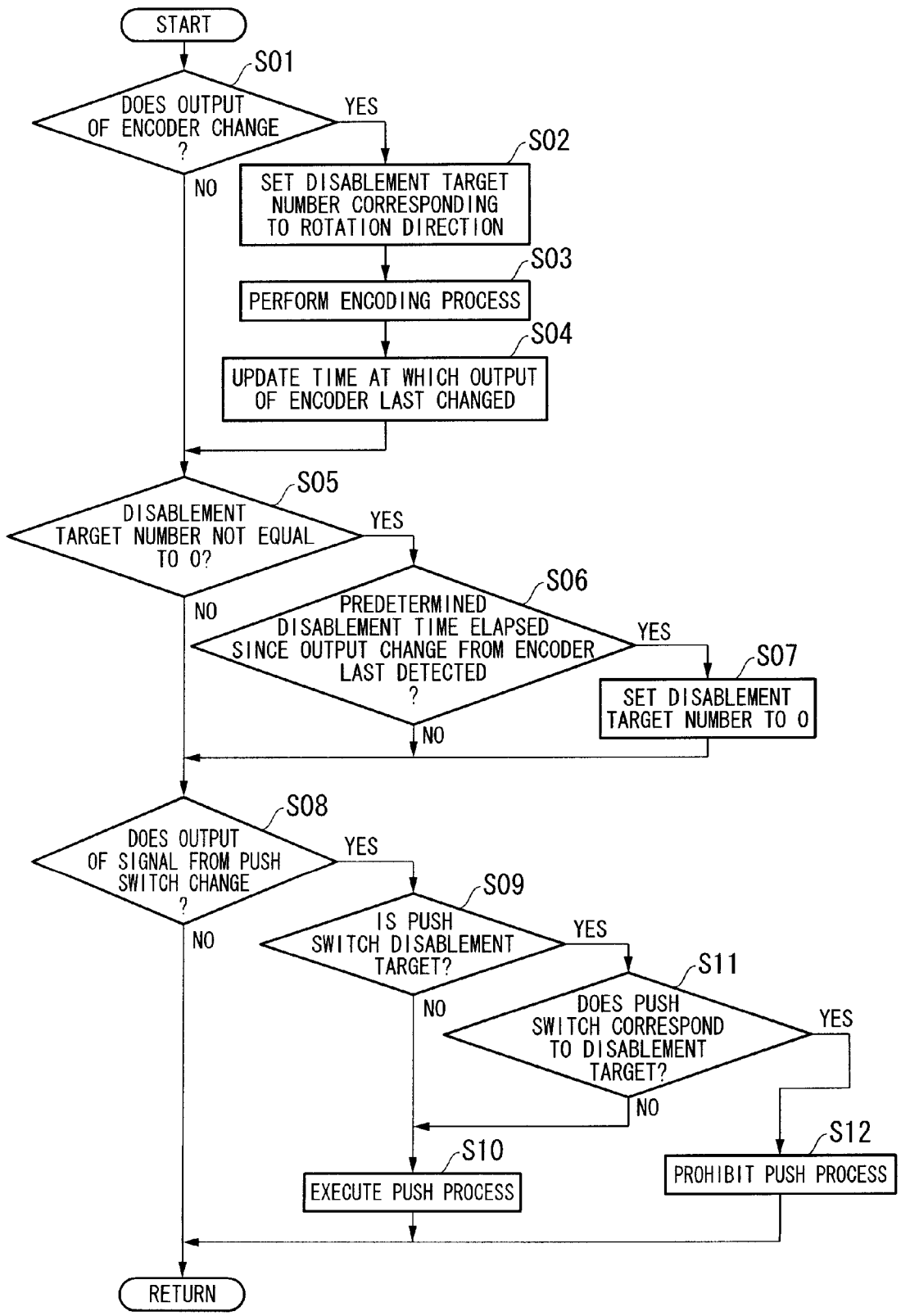
FIG. 4 is a flowchart that shows the operation of the switch device for a vehicle according to the embodiment.

First, for example in Step S01 shown in FIG. 4, it is determined whether or not there is an output change in the signal that is output from the rotary encoder 11b of the first switch 11.

In the case of this determination result being "NO", the process proceeds to Step S05 described below.

On the other hand, in the case of this determination result being "YES", the process proceeds to Step S02.

In Step S02, the disablement target number is set in accordance with the rotation direction of the rotation operation member 11a of the first switch 11 that is detected by the operation direction detection unit 26 based on the signal that is output from the rotary encoder 11b. For example, in the case of the portion of the outer periphery of the rotation operation member 11a that projects from the surface of the spoke portion 32 to the outside being rotated from the lower side to the upper side, the number "1" corresponding to the first push switch 12a that is disposed to be an approximate extension in this rotation direction is made the disablement target number. Also, in the case of the portion of the outer periphery of the rotation operation member 11a that projects from the surface of the spoke portion 32 to the outside being rotated from the upper side to the lower side, the number "2" corresponding to the second push switch 12b that is disposed to be an approximate extension in this rotation direction is made the disablement target number.

In Step S03, an encoding process is performed based on the signal that is output from the rotary encoder 11b of the first switch 11, and the rotational displacement, the rotational angle, and the like of the rotation operation member 11a are calculated.

In Step S04, the time at which an output change in the signal that is output from the rotary encoder 11b of the first switch 11 was last detected is updated and stored.

In Step S05, it is determined whether or not the disablement target number is other than "0".

If this determination result is "NO", that is, in the case of the number corresponding to the first push switch 12a or the number corresponding to the second push switch 12b has not set to the disablement target number, the process proceeds to Step S08 described below.

On the other hand, if this determination result is "YES", the process proceeds to Step S06.

In Step S06, it is determined whether or not a predetermined disablement time has elapsed from the time at which an output change in the signal that is output from the rotary encoder 11b was last detected.

In the case of this determination result being "NO", the process proceeds to Step S08 described below.

On the other hand, in the case of this determination result being "YES", the process proceeds to Step S07, and in Step S07, "0" is set to the disablement target number, and the process proceeds to Step S08.

In Step S08, it is determined whether or not there is an output change in the signal that is output from the second switch 12.

In the case of this determination result being "NO", the process returns.

On the other hand, in the case of this determination result being "YES", the process proceeds to Step S09.

In Step S09, it is determined whether or not the second switch 12 in which an output change was detected is the disablement target (that is, the first push switch 12a or the second push switch 12b).

In the case of this determination result being "NO", the process proceeds to Step S10, and in Step S10, the push process, that is, the control corresponding to the signal that is output from the second switch 12, is executed, and the process returns.

On the other hand, in the case of this determination result being "YES", the process proceeds to Step S11.

In Step S11, it is determined whether or not the second switch 12 in which an output change was detected corresponds to the disablement target number (that is, the first push switch 12a or the second push switch 12b).

In the case of this determination result being "NO", the process proceeds to the aforementioned Step S10.

On the other hand, in the case of this determination result being "YES", the process proceeds to Step S12.

In Step S12, execution of the push process, that is, the control that corresponds to the signal that has been output from the second switch 12, is prohibited, and the process returns.

As described above, according to the switch device 10 for a vehicle according to the present embodiment, the second switch 12 that is located substantially on an extension in the rotation direction of the first switch 11 is disabled until a predetermined time (disablement time) from after the rotation direction of the first switch 11 is detected elapses. Thereby, even in the case of the second switch 12 being erroneously operated without the intent of the driver in succession with a deliberate rotation operation by the operator to the first switch 11, it is possible to prevent the on-vehicle equipment 14 and the display device 15 from operating unnecessarily. As a result, it is possible to prevent erroneous operation of the on-vehicle equipment 14 and the display device 15 while preventing a rise in costs required for arranging a plurality of switches (for example, the first switch 11 and the second switch 12), and it is possible to suitably enhance the placement latitude of a plurality of switches (for example, the first switch 11 and the second switch 12) in the vehicle.

Moreover, in the case of the operator deliberately performing an input operation of the first switch 11 and an input operation of the second switch 12 in succession over a short time interval, due to the function relating to the input operation on the second switch 12 and the function relating to the input operation on the first switch 11 having a mutual relation, it is possible to prevent the execution of a control corresponding to the input operation on the second switch 12 from being prohibited against the will of the driver.

On the display screen of the display device 15, for the display relating to the second switch 12 that has been disabled, the brightness or contrast is reduced or stopped until the predetermined time (disablement time) elapses. For this reason, it is possible to recognize that the second switch 12 has been disabled by the operator, and moreover that the disablement of the second switch 12 has been released.

Figure 5:
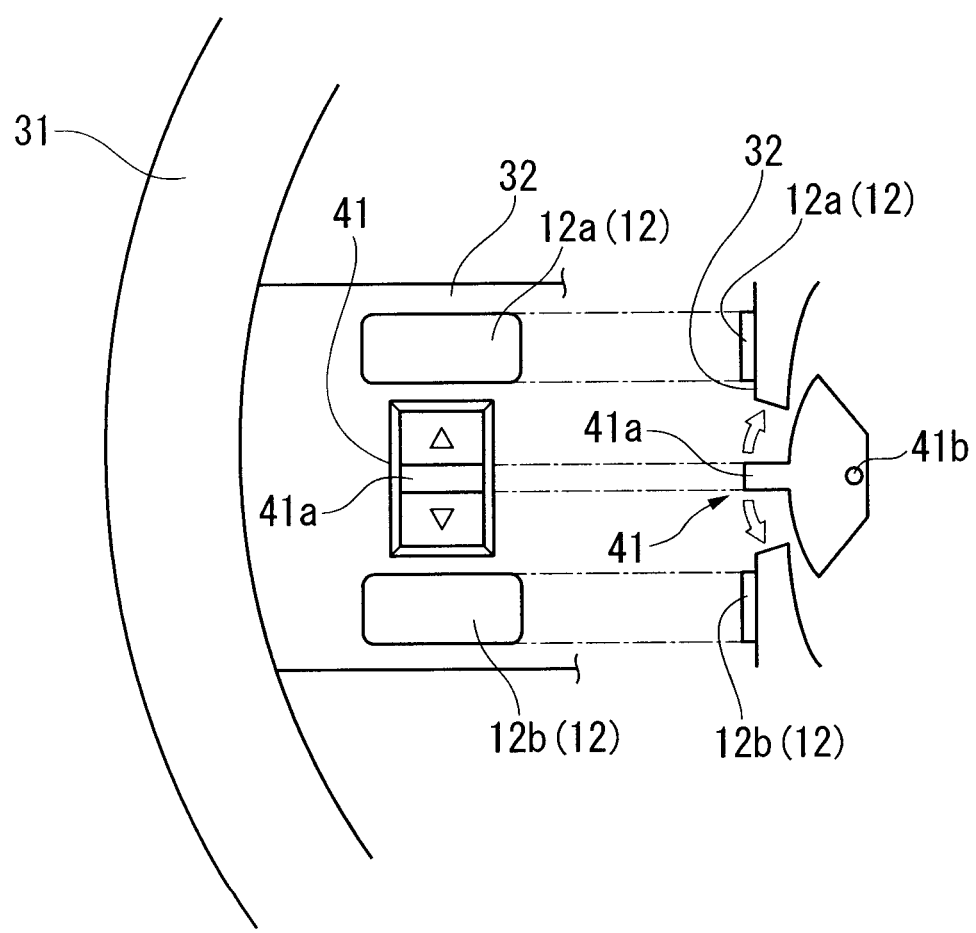
FIG. 5 is a front view that shows a placement example of the switch device for a vehicle according to a modification of the embodiment, with the cross-section thereof shown schematically.

Note that in the aforementioned embodiment, the first switch is a rotary switch. However, the present invention is not limited thereto. For example, in the modification shown in FIG. 5, instead of the first switch 11, it may be provided with a first switch 41 that consists of a leaning switch such as a toggle switch that allows input by a tilting operation by the operator.

The first switch 41 in this modification is provided with for example a tilt operation member 41a. The tilt operation member 41a is capable of tilting about the axis of a tilt axis 41b that extends in a horizontal direction that is parallel to the surface of the spoke portion 32. The distal end portion of this tilt operation member 41a projects from the surface of the spoke portion 32 to the outside, and is operated by the operator so as to tilt from the lower side to the upper side, or so as to tilt from the upper side to the lower side. The first switch 41 outputs a signal in accordance with the tilt direction, the tilt angle, and the like, of the tilt operation member 41a.

A first push switch 12a and a second push switch 12b are disposed on the surface of the spoke portion 32, on an approximate extension in the tilt direction of the distal end portion of the tilt operation member 41a that projects from the surface thereof to the outside. The first push switch 12a, in the case of the distal end portion of the tilt operation member 41a having been operated so as to tilt from the lower side to the upper side, is disposed on an extension in the rotation direction thereof (that is, above the rotation operation member 11a). The second push switch 12b, in the case of the distal end portion of the tilt operation member 41a having been operated so as to tilt from the upper side to the lower side, is disposed on an extension in the rotation direction thereof (that is, below the rotation operation member 11a).

In this modification, in the case of the tilt direction of the tilt operation member 41a of the first switch 41 being detected by the operation direction detection unit 26, that is, in the case of a tilting operation having been performed by the operator on the tilt operation member 41a of the first switch 41, the second switch 12 that is located substantially on an extension in the tilt direction (for example, the first push switch 12a or the second push switch 12b) is disabled until the predetermined time (the disablement time) elapses.

Note that in the embodiment described above, the first switch 11 is a rotary switch. However, the present invention is not limited thereto. For example, input by both a rotation operation and a tilting operation by the operator may be possible. In this case, the first switch 11 is for example rotatable about a rotational axis that extends in a horizontal direction that is parallel to the surface of the spoke portion 32, and is capable of tilting about the axis of a tilt axis that extends in a vertical direction parallel to the surface of the spoke portion 32.

In the case of a rotation operation being performed by the operator on the first switch, the second switch 12 that is located substantially on an extension in the rotation direction (for example, the first push switch 12a or the second push switch 12b) is disabled until a predetermined time (disablement time) elapses. In the case of a tilting operation being performed by the operator on the first switch, the second switch 12 that is located substantially on the extension of the tilt direction (for example, the third push switch 12c) is disabled until a predetermined time (disablement time) elapses.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A switch device for a vehicle comprising:
    a first switch that is provided at a predetermined location of a vehicle and that enables input by one of a rotation operation and a tilting operation;
    a second switch that is provided in the vicinity of the first switch and that enables input by a predetermined operation;
    an operation direction detector that detects an operation direction of the rotation operation of the first switch or the tilting operation of the first switch; and
    a controller that is capable of controlling an on-vehicle equipment in accordance with the input operations to the first switch and the second switch, wherein
    when the second switch is located on an extension of the operation direction of the first switch that is detected by the operation direction detector, the controller prohibits execution of a control of the on-vehicle equipment in accordance with the input operation to the second switch until a predetermined time from after the operation direction of the first switch is detected by the operation direction detector elapses.

2. The switch device for a vehicle according to claim 1, wherein
    when the function according to the input operation to the second switch and the function according to the input operation to the first switch are unrelated, to one another, the controller sets the predetermined time to a first predetermined value, and when the function according to the input operation to the second switch and the function according to the input operation to the first switch are related to one another, the controller sets the predetermined time to a second predetermined value, said second predetermined value being less than said first predetermined value.

3. The switch device for a vehicle according to claim 2, wherein
    when the function according to the input operation to the second switch and the function according to the input operation to the first switch relate to one another and adjust operating parameters of the vehicle, the controller sets the predetermined time to a third predetermined value, said third predetermined value being greater than said second predetermined value.

4. The switch device for a vehicle according to claim 1, wherein the first switch enables input by a rotation operation of rotating the first switch about a rotational axis that extends in a horizontal direction that is parallel to a mounting surface of the predetermined location, or a tilting operation of tilting the first switch about a tilt axis that extends in a horizontal direction or a vertical direction parallel to the mounting surface of the predetermined location.

5. The switch device for a vehicle according to claim 4, wherein the mounting surface of the predetermined location is provided at a spoke portion of a steering wheel of the vehicle.

6. The switch device for a vehicle according to claim 1, wherein the second switch enables input by a pressing operation.

* * * * *